US007273579B2

(12) United States Patent
Miller et al.

(10) Patent No.: US 7,273,579 B2
(45) Date of Patent: Sep. 25, 2007

(54) PROCESS FOR PRODUCTION OF GYPSUM/FIBER BOARD

(75) Inventors: David Paul Miller, Lindenhurst, IL (US); Joseph A. Yosick, Chicago, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 10/767,624

(22) Filed: Jan. 28, 2004

(65) Prior Publication Data

US 2005/0161853 A1 Jul. 28, 2005

(51) Int. Cl.
*B28B 11/24* (2006.01)
(52) U.S. Cl. .................................................... 264/333
(58) Field of Classification Search ................. 264/86, 264/87, 333, 40.1; 156/39, 42; 162/208, 162/211, 217; 106/660, 778, 780
See application file for complete search history.

(56) References Cited

U.S. PATENT DOCUMENTS

| 1,962,887 | A | * | 6/1934 | Ashley et al. ............... 423/555 |
|---|---|---|---|---|
| 2,018,955 | A | * | 10/1935 | Heckert et al. ............. 423/555 |
| 2,856,304 | A | * | 10/1958 | Kirk ........................... 428/533 |
| 3,223,082 | A | | 12/1965 | Smith |
| 3,579,300 | A | | 5/1971 | Bloom et al. |
| 3,592,670 | A | | 7/1971 | Kossuth et al. |
| 3,648,994 | A | | 3/1972 | Remmers et al. |
| 3,822,340 | A | | 7/1974 | Eberl et al. |
| 3,835,219 | A | * | 9/1974 | Jaunarajs et al. ........... 423/555 |
| 3,915,927 | A | * | 10/1975 | Jaunarajs et al. ........... 524/423 |
| 3,977,890 | A | | 8/1976 | Jaunarajs et al. |
| 4,029,512 | A | * | 6/1977 | Jaunarajs et al. ........... 106/775 |
| 4,091,080 | A | * | 5/1978 | Kosugi et al. ............... 423/555 |
| 4,126,599 | A | | 11/1978 | Sugahara et al. |
| 4,134,773 | A | | 1/1979 | Simeonov et al. |
| 4,140,748 | A | * | 2/1979 | Ore ........................... 423/157.4 |
| 4,146,402 | A | | 3/1979 | Kira et al. |
| 4,183,908 | A | * | 1/1980 | Rolfe ......................... 423/555 |
| 4,270,954 | A | | 6/1981 | Aignesberger et al. |
| 4,507,154 | A | | 3/1985 | Burge et al. |
| 4,801,355 | A | | 1/1989 | Johnstone et al. |
| 5,106,600 | A | | 4/1992 | Johnstone et al. |
| 5,286,412 | A | | 2/1994 | Northey et al. |
| 5,312,609 | A | * | 5/1994 | College ................... 423/243.08 |
| 5,320,677 | A | | 6/1994 | Baig |
| 5,558,710 | A | | 9/1996 | Baig |
| 5,879,446 | A | | 3/1999 | Patel et al. |
| 6,010,596 | A | | 1/2000 | Song |
| 6,197,235 | B1 | * | 3/2001 | Miller et al. .................. 264/86 |
| 6,416,695 | B1 | * | 7/2002 | Miller ........................... 264/86 |
| 6,699,364 | B2 | * | 3/2004 | Song et al. .................. 162/205 |

FOREIGN PATENT DOCUMENTS

JP 54-041952 A * 4/1979

OTHER PUBLICATIONS

Spring, Fred A., Process capability: a total quality management tool, Carfax Publishing Company, Total Quality Management, Mar. 95, vol. 6 Issue 1, p. 21-33.*

* cited by examiner

*Primary Examiner*—Christina Johnson
*Assistant Examiner*—Patrick Butler
(74) *Attorney, Agent, or Firm*—Michael M. Geoffrey; David F. Janci; Donald E. Egan

(57) ABSTRACT

An improved process calcining a gypsum/cellulosic fiber slurry to produce a composite gypsum/cellulosic fiber product resides in adding a selected crystal modifier to the gypsum/cellulosic fiber slurry prior to the heating step to reduce the time necessary to carry out the calcination process, to reduce the temperature at which the calcination process is run or to increase the aspect ratio of the acicular calcium sulfate alpha hemihydrate crystals formed during the calcination process. Useful crystal modifiers include aluminum sulfate, aluminum chloride, chlorine, zinc sulfate, iron (III) sulfate, aluminum sulfate hexadecahydrate, iron (II) sulfate heptahydrate, iron (III) sulfate pentahydrate, zinc sulfate heptahydrate, copper sulfate pentahydrate, copper chloride dehydrate, manganese sulfate monohydrate and trisodium phosphate.

7 Claims, No Drawings

PROCESS FOR PRODUCTION OF GYPSUM/FIBER BOARD

FIELD OF THE INVENTION

The present invention relates to an improved process for producing a composite gypsum/cellulosic fiber material. The process generally comprises mixing water, gypsum, and cellulosic fiber to form a dilute slurry; heating the dilute slurry under pressure to form acicular calcium sulfate alpha hemihydrate crystals. The heated slurry containing the acicular calcium sulfate alpha hemihydrate crystals is then dewatered to form a filter cake, preferably using equipment similar to paper making equipment, and before the slurry cools enough to rehydrate the hemihydrate to gypsum, the filter cake is pressed into a board of the desired configuration. The pressed board is cooled allowing the hemihydrate to rehydrate to gypsum and the rehydrated board is dried to form a dimensionally stable, strong and useful board product.

The present invention resides in adding a selected crystal modifier to the gypsum/cellulosic fiber slurry prior to the heating step. It has been discovered that adding a relatively small amount of a selected crystal modifier to the gypsum/cellulosic fiber slurry may be used to reduce the time necessary to carry out the calcination process, to reduce the temperature at which the calcination process is run or to increase the aspect ratio of the acicular calcium sulfate alpha hemihydrate crystals formed during the calcination process. The improved process of the present invention further contemplates monitoring the aspect ratio of the acicular calcium sulfate alpha hemihydrate crystals formed by the heating step and adjusting the amount of crystal modifier in the slurry to control the aspect ratio of the crystals and to maintain the aspect ratio of the crystals within a selected range.

BACKGROUND AND PRIOR ART

Certain properties of gypsum (calcium sulfate dihydrate) make it very popular for use in making industrial and building products; especially gypsum wallboard. It is a plentiful and generally inexpensive raw material which, through a process of dehydration and rehydration, can be cast, molded or otherwise formed into useful shapes. It is also noncombustible and relatively dimensionally stable when exposed to moisture. However, because it is a brittle, crystalline material which has relatively low tensile and flexural strength, its uses are typically limited to non-structural, non-load bearing and non-impact absorbing applications.

Gypsum wallboard; i.e. also known as plasterboard or drywall, consists of a rehydrated gypsum core sandwiched between multi-ply paper cover sheets, and is used largely for interior wall and ceiling applications. Because of the brittleness and low nail and screw holding properties of its gypsum core, conventional drywall by itself cannot support heavy appended loads or absorb significant impact. Accordingly, means to improve the tensile, flexural, nail and screw holding strength and impact resistance of gypsum plasters and building products have long been, and still are, earnestly sought. Another readily available and affordable material, which is also widely used in building products, is lignocellulosic material particularly in the form of wood and paper fibers. For example, in addition to lumber, particleboard, fiberboard, oriented strand board (OSB), plywood and hardboard (high density fiberboard) are some of the forms of processed lignocellulosic material products used in the building industry. Such materials have better tensile and flexural strength than gypsum. However, they are also generally higher in cost, have poor fire resistance and are frequently susceptible to swelling or warping when exposed to moisture Therefore, affordable means to improve upon these use-limiting properties of building products made from cellulosic material are also desired.

Previous attempts to combine the favorable properties of gypsum and cellulosic fibers, particularly wood fibers, have had very limited success. Attempts to add cellulosic fibers, (or other fibers for that matter), to gypsum plaster and/or plasterboard core have generally produced little or no strength enhancement because of the heretofore inability to achieve any significant bond between the fibers and the gypsum. U.S. Pat. Nos. 4,328,178; 4,239,716; 4,392,896 and 4,645,548 disclose recent examples where wood fibers or other natural fibers were mixed into a stucco (calcium sulfate hemihydrate) slurry to serve as reinforcers for a rehydrated gypsum board or the like.

U.S. Pat. No. 4,734,163 teaches a process in which raw or uncalcined gypsum is finely ground and wet mixed with 5-10% paper pulp. The mash is partially dewatered, formed into a cake and further dewatered by pressure rolls until the water/solids ratio is less than 0.4. The cake is cut into green boards, which, after being trimmed and cut, are stacked between double steel plates and put into an autoclave. The temperature in the autoclave is raised to about 140° C. to convert the gypsum to calcium sulfate alpha hemihydrate. During the subsequent incremental cooling of the boards, the hemihydrate rehydrates back to dihydrate (gypsum) and gives the board integrity. The boards are then dried and finished as necessary.

The process of water felting dilute aqueous dispersions of various fibrous materials is a well-known commercial process for manufacturing many types of paper and board products. In this process, an aqueous dispersion of fiber, binder and other ingredients, as desired or necessary is flowed onto a moving foraminous support wire, such as that of a Fourdrinier or Oliver mat forming machine, for dewatering. The dispersion may be first dewatered by gravity and then dewatered by vacuum suction means; the wet mat is then pressed to a specified thickness between rolls and the support wire to remove additional water. The pressed mat is then dried in heated convection or forced air drying ovens, and the dried material is cut to the desired dimensions.

U.S. Pat. No. 5,320,677 to Baig describes a composite material made from gypsum and cellulosic particles of a reinforcing material, such as lignocellulose fibers, hereinafter sometimes referred to as gypsum/wood fiber board. The composite material is produced by mixing gypsum and cellulosic particles of a stronger substance, such as wood fibers, in a dilute aqueous slurry. The slurry is heated in an autoclave, preferably under pressure, to convert the gypsum to calcium sulfate alpha hemihydrate. The hot, converted slurry is discharged through a headbox onto a continuous felting conveyor of the type used in paper making operations, where the slurry is dewatered to remove as much uncombined water as possible before rehydrating the hemihydrate back to gypsum. The resulting rehydrated material is a homogeneous mass comprising gypsum crystals physically interlocked with the discrete cellulosic particles. The resulting mat is then dried in heated convection or forced air drying ovens, and the dried board is cut to the desired dimensions.

In order to produce the best composite product it is essential to form acicular crystals of calcium sulfate alpha hemihydrate that have a fairly high aspect ratio because the crystals with high aspect ratios produce composite products with a high strength. However, if the crystals have an aspect ratio that is too high, the filter cake is difficult to dewater effectively. Further, problems occur if impurities, such as organic compounds, get into the gypsum/fiber slurry because some impurities can cause the calcination process to produce short blocky crystals that produce a GWF board that is low in strength. The crystals with the higher aspect ratios are smaller in diameter and have a greater surface area and it is theorized that the crystals with the higher aspect ratios provide a greater number of adhesion points as compared to the short blocky crystals. While the short blocky crystals may have higher tensile and flexural strength, they produce board products that are not as strong as the board products produced from the crystals with the higher aspect ratios.

Accordingly, one object of the present invention is to use selected crystal modifiers to reduce the time and/or lower the temperature conditions under which the calcium sulfate alpha hemihydrate crystals are formed. Another object of the present invention is to use crystal modifiers to produce a slurry containing calcium sulfate alpha hemihydrate crystals having aspect ratios within a selected target range.

SUMMARY OF THE INVENTION

The process of the present invention generally comprises mixing water, gypsum, and a cellulosic fiber to form a dilute slurry; heating the dilute slurry under pressure to calcine the gypsum and form acicular calcium sulfate alpha hemihydrate crystals. The improvement of the present invention contemplates adding a relatively small amount of a selected crystal modifier to the gypsum/cellulosic fiber slurry to alter the high-temperature, high-pressure calcination process in which the acicular calcium sulfate alpha hemihydrate crystals are formed. For instance, selected crystal modifiers may be used to reduce the time necessary to carry out the calcination process, or to reduce the temperature at which the calcination process is run or to adjust the aspect ratio of the acicular calcium sulfate alpha hemihydrate crystals formed during the calcination process. Reducing the calcination temperature and/or calcination time results in a reduction in the energy requirement to run the process which is a major advantage.

It has been discovered that metal sulfate salts such as aluminum sulfate, zinc sulfate, iron sulfate, copper sulfate, or manganese sulfate may be used to either lower the required residence time by increasing the rate of calcination and/or to lower the minimum temperature at which the calcination occurs. Still other crystal modifiers, such as aluminum chloride, chlorine (in the form of sodium hypochlorite), copper chloride dihydrate, or trisodium phosphate can also be used either to lower required residence time by increasing the rate of calcination and/or to lower the minimum temperature at which the calcination occurs. Aluminum sulfate, aluminum chloride and chlorine act as crystal modifiers to change the crystal morphology to the desired configuration.

The acicular calcium sulfate alpha hemihydrate crystals formed by heating a dilute slurry of gypsum and wood (or other cellulosic) fibers under pressure generally have a fairly high aspect ratio, i.e. 10 to 1 or higher. Composite structures formed with such calcium sulfate alpha hemihydrate crystals have relatively high strength properties. Impurities, such as organic compounds, that can come into the slurry from a variety of sources can cause the calcination process to produce shorter blocky crystals that produce products that are relatively low in strength.

It has also been discovered that the same crystal modifiers may be used to increase the aspect ratio of the acicular calcium sulfate alpha hemihydrate crystals formed during the calcination process. It has further been discovered that crystal modifiers may be used to control the aspect ratio of the crystals to a selected range. In this embodiment, the present invention contemplates continuously monitoring the aspect ratio of the acicular calcium sulfate alpha hemihydrate crystals formed by the calcination process and adjusting the amount of crystal modifier in the slurry to control the aspect ratio of the crystals and to maintain the aspect ratio of the crystals within a selected range. It is preferred to use alum $[Al_2(SO_4)_3 \cdot 14\ H_2O]$ as the crystal modifier to control the aspect ratio of the acicular calcium sulfate alpha hemihydrate crystals formed during the calcination process to a selected range.

A further advantage of such modifiers is their advantageous effect on the rehydration process of the formed composite into the rigid gypsum form. Typically, accelerators are added to the hot slurry of calcium sulfate hemihydrate fibers at the headbox of the forming machine. Aluminum sulfate is one of such additives that tends to improve the rate of rehydration. Since the aluminum sulfate is added as a solution to the headbox slurry prior to the dewatering step, some aluminum sulfate may be lost from the mat prior to the rehydration step. It has been found that the aluminum sulfate added prior to the reactors also tends to improve rehydration rate of the formed composite. It is postulated that the beneficial rehydration rate effects of the aluminum hydrate have been incorporated into the hemihydrate crystal, which is then released at the proper time as the hemihydrate crystals convert to gypsum in the final composite.

DETAILED DESCRIPTION OF THE INVENTION

The process of the present invention generally comprises mixing water, gypsum, a cellulosic fiber and a crystal modifier to form a dilute slurry; heating the dilute slurry under pressure to calcine the gypsum and form acicular calcium sulfate alpha hemihydrate crystals. The basic process begins with a mixing of uncalcined gypsum, cellulosic particles and water to form a dilute aqueous slurry. The source of the gypsum may be from raw ore or from the by-product of a flue-gas-desulphurization or phosphoric-acid process. The gypsum should be of a relatively high purity, i.e. preferably at least about 92-96%, and finely ground, for example, to 92-96% minus 100 mesh or smaller. Larger particles may lengthen the conversion time. The gypsum can be introduced either as a dry powder or via an aqueous slurry.

The source of the cellulosic fiber may be waste paper, wood pulp, wood flakes, and/or another plant fiber source. It is preferable that the fiber be one that is porous, hollow, split and/or rough surfaced such that its physical geometry provides accessible interstices or voids which accommodate the penetration of dissolved calcium sulfate. In any event the source, for example, wood pulp, may also require prior processing to break up clumps, separate oversized and undersized material, and, in some cases, pre-extract strength retarding materials and/or contaminants that could adversely affect the calcination of the gypsum; such as hemi-celluloses, acetic acid, etc.

The ground gypsum and cellulosic fibers are mixed together in a ratio of about 0.5 to 30% by weight wood fibers. Sufficient water is added to make a slurry having a consistency of about 5-30% by weight solids although, 5-15% by weight solids is preferable for efficient processing and handling.

The slurry is continuously pumped through a Continuously Stirred Tank Reactor (CSTR) system. Crystal modifiers are preferably added to the slurry at this point to stimulate or retard crystallization or to lower the calcining temperature. Steam is injected into the CSTR system to bring the interior temperature of the vessel up to between about 212° F. (100° C.) and about 350° F. (177° C.), and autogeneous pressure; the lower temperature being approximately the minimum at which the calcium sulfate dihydrate will slowly calcine to the hemihydrate state; and the higher temperature being about the maximum temperature for calcining hemihydrate without undue risk of causing some of the calcium sulfate hemihydrate to convert to anhydrite. It has been found that the best board products are produced if the calcination process is carried out at a temperature on the order of about 285° F. (140° C.) to 305° F. (152° C.) for 12 to 25 minutes, but preferably the calcination is carried out at a temperature of from 290° F. (143° C.) to 300° F. (149° C.) for about 15 minutes.

When the slurry is heated under these conditions for a sufficient period of time, the calcium sulfate dihydrate molecule dissolves and converts it to the calcium sulfate hemihydrate molecule. Due to the differential solubility of dihydrate and hemihydrate at the calcination temperature, the hemihydrate recrystallizes in the alpha form. As the conversion of the gypsum to calcium sulfate hemihydrate proceeds, saturation of the solution is reached, and the hemihydrate begins to nucleate and form crystals at a nucleation site. The solution, aided by the continuous agitation to keep the cellulosic fiber particles in suspension and fresh solute around the recrystallization sites, will wet out and penetrate the open voids in the cellulosic fibers and form crystals in, on and around the voids and along the walls of the cellulosic fibers.

After the conversion of the calcium sulfate dihydrate to the hemihydrate is complete, the hot, converted slurry is discharged through a headbox onto a continuous felting conveyor of the type used in paper making operations, where the slurry is dewatered to remove as much uncombined water as possible before rehydrating the calcium sulfate hemihydrate back to gypsum. As much as 90% of the slurry water is removed by the dewatering devices, leaving a filter cake of approximately 35% water by weight. The removed water is preferably recycled to make up additional gypsum/cellulosic fiber slurry. After the dewatering stage, the filter cake consists of cellulosic fibers interlocked with rehydratable calcium sulfate hemihydrate crystals and can still be broken up into individual composite fibers or nodules, shaped, cast, or compacted to a higher density. Composite board products are formed by shaping the filter cake, rehydrating the calcium sulfate hemihydrate crystals to gypsum and drying the resulting board.

The present invention contemplates adding a relatively small amount of a selected crystal modifier to the gypsum/cellulosic fiber slurry to alter the high-temperature, high-pressure calcination process in which the acicular calcium sulfate alpha hemihydrate crystals are formed. For instance, selected crystal modifiers may be used to reduce the time necessary to carry out the calcination process, or to reduce the temperature at which the calcination process is run or to adjust the aspect ratio of the acicular calcium sulfate alpha hemihydrate crystals formed during the calcination process. Reducing the calcination temperature and/or calcination time lowers the energy requirement to run the process, which is a major advantage. It has also been found that certain crystal modifiers may be used to reduce the calcination temperature and/or reduce the calcination time and produce calcium sulfate hemihydrate crystals having a good aspect ratio.

It has been discovered that metal sulfate salts such as aluminum sulfate, zinc sulfate, iron sulfate, copper sulfate, or manganese sulfate may be used to either lower the required residence time by increasing the rate of calcination and/or to lower the minimum temperature at which the calcination occurs. Still other crystal modifiers, such as aluminum chloride, chlorine (in the form of sodium hypochlorite), copper chloride dihydrate, or trisodium phosphate can also be used either to lower required residence time by increasing the rate of calcination and/or to lower the minimum temperature at which the calcination occurs.

When the calcium sulfate hemihydrate begins to nucleate, the crystals begin to form at a nucleation site. The acicular crystals formed by this process tend to grow in one dimension, namely the nucleation sites at the end of the fiber. The hemihydrate tends to precipitate from the saturated solution and crystallize more rapidly at the end of the existing crystal than around, the diameter, whereby a linear crystal, having a high aspect ratio, is formed. As the crystallization process continues in a linear manner the aspect ratio of the hemihydrate crystals increases. It is theorized that certain impurities precipitate onto the ends of growing hemihydrate crystals, which blocks the growth of linear crystals and decreases the growth rate at the end of the crystal relative to the diameter of the crystal. Thus the impurities cause the formation of short blocky crystals.

The acicular crystals formed by heating a dilute slurry of gypsum and cellulosic fibers under pressure preferably have a fairly high aspect ratio and can be used to produce composite structures having a high strength. Generally, the tensile strength of the composite product increases as the aspect ratio of the acicular fibers increases. It has been discovered however, that if the aspect ratio of the acicular crystals is too high, e.g. when "Franklin" fibers having an aspect ratio greater than about 40, the resulting filter cake or mat is increasingly difficult to dewater and causes formation problems that reduce the strength of the resulting composite product. Generally, the calcium sulfate alpha hemihydrate crystals should have an aspect ratio between at least about 5 and no more than about 50 and it is preferred that the calcium sulfate alpha hemihydrate crystals have an aspect ratio of between about 10 and 20.

As explained above, impurities from various sources in the gypsum/fiber slurry can cause the calcination process to produce short blocky crystals that lack produce products that are relatively low in strength. Moreover, the short blocky crystals have a tendency to pass through the foraminous support wire, such as that of a Fourdrinier or Oliver mat forming machine, during the dewatering process. It has been discovered that the water used to form the gypsum/fiber slurry sometimes contains impurities, such as organic materials, that cause formation of short, blocky crystals of calcium sulfate alpha hemihydrate in the calcination process. The gypsum, dependent upon its source, may include components such as carbonates or organic materials that tend to cause the formation of blocky crystals. The cellulosic fiber, again depending upon the source, may contain a variety of organic impurities such as resins from the wood fibers or various types of contamination from used paper or corrugated cardboard that interfere with the production of acicular crystals.

Because commercial production facilities are frequently designed to run on a continuous basis, i.e. a 24/7 schedule, the build-up of impurities from the gypsum and cellulosic fiber pose a greater problem than the impurities in the water. In continuous operations, the dewatering devices collect up to 90% of the water from the calcined slurry and the colleted water is recycled. The recycled water is mixed with gypsum and fiber, along with additional make up water, to make the gypsum/fiber slurry fed to the calcination process. Thus, the impurities brought into the system by the water do not build up very quickly as the operation of the plant continues. However, any water soluble impurities brought into the process by the gypsum or the cellulosic fiber will be recycled with the water and such impurities will build up in the system over time and create a need to adjust the crystal modifier level.

The aspect ratio of the crystals formed in the calcination process may be monitored either directly or indirectly. The aspect ratio crystals may be monitored directly by a microscopic examination of the morphology of the crystals in samples of the hot slurry emerging from the autoclave system. Samples are characterized according to percentage converted, crystal length, and crystal aspect ratio.

The aspect ratio of the crystals may be monitored indirectly by examining the de-watering process and the rehydration process. A greater proportion of crystals having a high aspect ratio are retained on the wire and provide more effective dewatering than blocky crystals which are lost through the wire and make a non-uniform layered product. The high aspect ratio crystals also rehydrate quicker than short blocky crystals.

The aspect ratio of crystals is preferably controlled by addition of a small amount of alum ($Al_2(SO_4)_3 \cdot 14 H_2O$) to the gypsum/fiber slurry prior to calcination. The addition of the alum to the dilute slurry of gypsum and cellulosic fibers normally produces acicular crystals of calcium sulfate alpha hemihydrate with a higher aspect ratio and consequently produces composite structures with higher strength.

Adding larger quantities of alum to the process is not a practical way to overcome the blocky crystal problem. In addition to the fact that alum costs money, alum can produce some unwanted effects in the calcination step and the board-forming process. For example, the alum reacts with the carbonates that are present in some of the gypsum raw materials and the reaction forms foam that is difficult to handle in the board-forming process. Moreover, if too much alum is added, the aspect ratio of the crystals may become too high. When the aspect ratio of the crystals is too high, the pore space between the crystals becomes smaller and increases surface tension of the water and interferes with draining the water from the mat in the dewatering step and produces a non-uniform board.

One embodiment of the present invention contemplates continuously adjusting the level of crystal modifier added to the gypsum/cellulosic fiber slurry to maintain the aspect ratio of the crystals being produced within a selected range. In this embodiment, the aspect ratio of the acicular calcium sulfate alpha hemihydrate crystals is continuously monitored. When the monitoring indicates the aspect ratio of said crystals is lower than a first selected value, the amount of crystal modifier used to form said slurry increases to an amount sufficient to increase said aspect ratio to no lower than said first selected value; and when the monitoring indicates the aspect ratio of said crystals is greater than a second selected value, the amount of crystal modifier being used to form said slurry is decreased to an amount sufficient to decrease said aspect ratio to no greater than said second selected value.

The preferred form of alum is known as "papermakers" alum. "Paper makers" alum is a clear, light green to light yellow aqueous solution containing about 48.5% aluminum sulfate, on a dry basis. The chemical formula is $Al_2(SO_4)_3 \cdot 14 H_2O$. Alum is also preferred because it tends to accelerate the rehydration of the hemihydrate crystals. Typically, about 0.10% of alum is used for rehydration of the hemihydrate to the dihydrate in the formed composite. For use as a crystal modifier in the present invention, about one liter of papermaker's alum per 100 gallons of gypsum/fiber slurry (about 0.4% solids based on the total slurry) is sufficient to overcome problems caused by impurities. The optimum dosage is sufficient alum to provide the highest board hardness.

In the process of preparing gypsum wood fiber board products, it is essential that the rehydration process be essentially complete before the drying step commences. It has been found that boards containing un-hydrated calcium sulfate hemihydrate have reduced strength, dusty surfaces and poor adhesion to paint. It is preferred to use alum as the crystal modifier because it accelerates the rehydration of the hemihydrate crystals to gypsum.

In addition to increasing the aspect ratio of the crystals formed in the calcination process, the addition of alum to the gypsum/cellulosic. fiber slurry provides a shorter residence time and/or a lower calcination temperature for the calcination process.

Chlorine in the form of sodium dichloro-s-triazinetrione may also be added to the reactor system to drive the crystal morphology to the high aspect ratio hemihydrate crystal. Dosages up to 5 ppm chlorine improve the aspect ratio. Dosages greater than 11 ppm chlorine also causing increased settling of the feed slurry, which in some cases may be a disadvantage.

Aluminum chloride is also effective in promoting the formation of high aspect ratio hemihydrate crystals in the reactors and appears more effective than the alum or chloride alone.

The problem of blocky crystals may also be overcome by the addition of minerals that have been shown to affect the crystal structure in the gypsum wood fiber board calcination process, such as iron sulfate and zinc sulfate. Although not intending to be bound by any particular theory, it is believed that these crystal modifiers may have the following effects: increasing the rate of the conversion of calcium sulfate dehydrate to calcium sulfate hemihydrate, increasing the rate of nucleation of the calcium sulfate hemihydrate, and/or counteracting the effects of contaminants on the calcinations process.

EXAMPLES

The following examples will serve to illustrate the preparation of several coated gypsum/fiber board products within the scope of the present invention. It is understood that these examples are set forth for illustrative purposes and that many other products are within the scope of the present invention. Those skilled in the art will recognize that similar products may be prepared using other quantities of materials and equivalent species of materials than those illustrated below.

Example 1

A gypsum/cellulosic fiber slurry was prepared as follows: A cellulosic fiber pulp was prepared at 2.6% consistency in a pilot hydrapulper from old corrugated cardboard (OCC) and water. Enough material for all the runs on a given day was prepared to minimize the effects of variation in the fiber source. A synthetic gypsum obtained from Pennsylvania Electric was used. All experiments were conducted on a slurry containing 15% solids, with fiber comprising 10% of the solids.

The slurry, having a pH of 7.3, was passed through a continuous 90 gallon stirred reactor system. The slurry residence time through the reactors at 295° F. (146° C.) was about 15 minutes. Initial slurry out of the calcining reactors showed poor conversion (25%) and short blocky crystals (aspect ratio of less than 5:1). Four liters of alum (48% aluminum sulfate 18 hydrate) was added to 100 gallons of slurry and the pH dropped to 4.05 at 12:01 PM. By 12:08 PM, conversion had increasedrto 70% with 90% conversion by 12:17 and full conversion at 12:34. At 12:51, the slurry feed to the reactors had a pH of 5.2 and the slurry coming out of the reactors had a pH of 7 with full conversion of crystals having an aspect ratio of greater than 10:1. This implied that the alum was actually incorporated into the crystals during formation. In particular, since the solution was saturated with sulfate from the dissolving calcium sulfate, this implies a greater chance of the effect being due to the aluminum cation than the common ion effect of the sulfate.

Upon rehydration on the line, panel became very hard with the standard accelerator dosage, implying the aluminum sulfate was still present in some form and increased the rate of rehydration. (Alum is commonly added at the headbox to increase the rate of rehydration.) Thus, the process provides a method to incorporate alum into the acicular calcium sulfate hemihydrate crystals during formation and retain the alum in the crystals in the formed mat, with minimal loss of alum during the mat formation as the water is removed from the slurry. Papermaker's alum (aluminum sulfate) has been found to improve poor calcination when added to the feed tank upstream of the reactors. The common form of the alum is 48% solids solution which can easily be metered by positive displacement pumps into the process.

Example 2

A gypsum/cellulosic fiber Feed slurry was prepared at 8% solids with 10% fiber using Southard TERRA ALBA as gypsum and Modulux fiber (lodgepole pine mix with Douglas fir, true fir/spruce etc. from the Pilot Rock, Oregon plant) as cellulosic fiber. Granular chlorine was added to the feed slurry as shown below in TABLE 1:

TABLE 1

| FEED TANK LEVEL | TARGET PPM $CL_2$ | GRAMS NEEDED | GRAMS HAVE | GRAMS ADDED | PANEL TO MAKE |
|---|---|---|---|---|---|
| 250 | 0 | 0 | 0 | | |
| 200 | 1 | 1.134 | 0 | 1.134 | 1 |
| 150 | 2 | 1.701 | 0.0850 | 0.846 | 2 |
| 125 | | | | | 3 |
| 100 | 3 | 1.701 | 0.567 | 1.134 | 4 |
| 75 | | | | | 5 |
| 50 | 4 | 1.134 | 0.2835 | 0.851 | 6 |
| 25 | | | | 8.456 | REST |

The chlorine source was "Eilrich Bros. Pools Ltd. Sani-Spa" with the following composition:

| | |
|---|---|
| Sodium Dichloro-s-triazinetrione anhydrous. | 96% |
| Inert Ingredients | 4% |
| Available Chlorine | 62% |

Chlorine content in the feed tank and in the product holding tank was estimated with the ATI "Water-Chex" calorimetric squeeze sampler method.

The slurry was calcined with continuous feed through a 12 gallon continuous stirred three reactor system (CSTR) and excess accumulated in an agitated product holding tank. The calcined slurry was then collected in calibrated buckets and manually discharged into the 26" by 26" deckle box for dewatering.

Test panels were prepared from the hot calcined slurry by dewatering to form a filter cake using equipment similar to paper making equipment, and before the slurry cooled enough to rehydrate the hemihydrate to gypsum, the filter cake was pressed into a board of the desired configuration and then dried.

The pH of the feed slurry dropped substantially from 7.5 to 7.1 after the initial addition of chlorine (seethe following table). The pH of the calcined slurry at the discharge pump appeared to increase and then decrease during the run as shown in Table 2. The massive chlorine dosage appeared to cause a pH decrease from that at the measured 2 ppm concentration. Since the calorimetric test had an upper limit of 11 ppm, the actual concentration after the massive dosage could only be estimated as greater than 11 ppm since 11 ppm from the colorimetric chart was orange and the measured color was past orange to brown.

TABLE 2

| FEED TANK LEVEL | TARGET PPM $Cl_2$ | FEED PPM $Cl_2$ | DIS- CHARGE $Cl_2$ | MEA- SURED pH FEED | MEASURED pH CALCINED |
|---|---|---|---|---|---|
| 250 | 0 | 0 | 0 | 7.52 | |
| 225 | | | | | 5.87 |
| 200 | 1 | | 0 | | 6.45 |
| 175 | | 0.5 | 0 | 7.14 | 6.77 |
| 150 | 2 | 0.5 | 0 | 7.24 | 6.79 |
| 125 | | 1.2 | 0 | 7.13 | 6.71 |
| 100 | 3 | | 0 | 7.19 | 6.85 |
| 75 | | 2 | 0 | 7.2 | 6.94 |
| 65 | | 2 | 0 | 7.29 | 7.06 |
| 50 | 4 | | | | |
| 30 | | 2.4 | 0 | 7.14 | 6.85 |
| 20 | | >11 | 0 | | 6.6 |

The final massive dosage of chlorine appeared to cause the feed slurry to more rapidly settle into solids and a clear layer of liquor when agiatation was removed.

Measured chlorine content of the feed slurry was lower than that calculated, implying some chlorine was lost either to atmosphere or through reaction with materials in slurry.

Reactions with materials in the slurry might be either through a sulfate complex with the gypsum component or through chlorination of some of the wood components. Although the measured chlorine in the feed slurry increased with increased chlorine addition, the measured chlorine in the flashed calcined slurry remained at 0, even after the final massive dosage of chlorine to the feed slurry. The 0 ppm measured chlorine may have been because 1) the chlorine was lost as gas with the flashed steam or 2) chlorine had reacted with sulfate or 3) chlorine had reacted with the wood component to form chlorinated products. If 2) and 3) did not consume all the chlorine, the remaining would probably have been lost with the flashed steam.

Light micrographs of the calcined slurry were taken before chlorine addition to the feed tank and with measured chlorine contents of 0 ppm, 0.5 ppm, 2 ppm and greater than 11 ppm. The corresponding calcined slurry pH values were 6.4, 6.8, 7.0, and 6.6. The longest and finest crystals appeared to be made from slurry containing the higher concentrations of chlorine at the end of the run. There was no statistically significant difference between the machine and cross direction for bending strength, bending stiffness, density, or thickness.

Chlorine addition to the feed slurry of the GWF process did not adversely affect bending strength or stiffness. The 2 ppm chlorine dosage appeared to roughly double the aspect ratio and increase conversion from 80 to 95%. Likewise crystal form was not adversely affected and may have been enhanced to longer, finer crystals.

Examples 3 through 13

A cellulosic fiber pulp was prepared at 2.6% consistency in a small Adirondack hydrapulper from old corrugated cardboard (OCC) and water. Enough material for all the runs on a given day was prepared to minimize the effects of variation in the fiber source. A synthetic gypsum obtained from Pennsylvania Electric was used. All experiments were conducted on a slurry containing 12% solids, with fiber comprising 10% of the solids. A control run was performed for each batch of pulp to use as a basis of comparison.

The reactor was a 2-gallon steam jacketed stirred tank reactor. The slurry was introduced into the reactor, the reactor was bolted closed and steam introduced into the jacket. Temperature was measured with a thermocouple inserted in the reactor. The steam pressure was controlled to reach the desired temperature as quickly as possible and then maintained within a few degrees of the desired setpoint. The timer was started at five degrees below the desired setpoint. For runs investigating possible contaminants, the setpoint was 295° F. (146° C.); for enhancers, the setpoint ranged from 250° (121° C.) to 270° F. (132° C.). Temperature was generally maintained to within +/−3° F. of the setpoint. The time to reach the setpoint ranged from 5 minutes to reach 250° (121° C.) to 15 minutes to reach 295° F. (146° C.).

Slurry samples were obtained by opening the discharge valve at the bottom of the reactor. Multiple samples could be obtained from a single run, and were typically taken at around 5, 10, and 15 minutes to observe the progression of calcination. The hot slurry was placed on a slide and qualitatively analyzed under a microscope. Samples were characterized according to percentage converted, crystal length, and crystal aspect ratio.

Several types of crystal morphologies were typically observed. These were designated:
1) normal—indistinguishable from a control run; mixture of crystal lengths, with aspect ratios greater than 5.
2) unconverted—uncalcined gypsum crystals present; less than 10% hemihydrate crystals
3) C-base—converted crystals, but with aspect ratios less than 5
4) Franklin Fiber—medium length crystals with aspect ratios greater than about 40, similar to those observed in calcination with no wood fiber present; slurry is characterized by a creamy color and is more difficult to dewater than normal control slurry.

The salts were added at loading levels generally less than 1% by weight of gypsum. Calcination temperatures ranged from 240° to 270° F. Multiple samples of a given run were taken to determine the time to complete conversion. Sodium sulfate and magnesium chloride hexahydrate were found to have no effect at 1% loading. The other results are summarized in Table 3 below.

Loadings are percentage of additive based on the mass of gypsum; the columns at right specify the approximate time in minutes to achieve 90% conversion at a given temperature. "No" indicates that conversion was less than 10%. Control runs without crystal modifiers were unable to achieve acceptable crystals at temperatures below 280° or times less than 12 minutes.

TABLE 3

Effect of Crystal Modifiers on calcination. Minimum Process conditions at which acceptable crystals were formed

| EX. # | Crystal Modifier | Loading | Minimum temperature (° F.) | Minimum time (min) |
|---|---|---|---|---|
| 3 | aluminum sulfate hexadecahydrate | 1% | 270 | 12 |
| 4 | copper chloride dihydrate | 1% | 270 | 6 |
| 5 | iron (II) sulfate heptahydrate | 0.3% | 260 | 6 |
| 6 | iron (III) sulfate pentahydrate | 1% | 250 | 6 |
| 7 | | 0.67% | 260 | 8 |
| 8 | tri sodium phosphate | 1% | 250 | 8 |
| 9 | | 0.3% | 260 | 8 |
| 10 | zinc sulfate heptahydrate | 1% | 250 | 4 |
| 11 | | 0.3% | 260 | 15 |
| 12 | zinc sulfate monohydrate | 3.7% | no | no |
| 13 | | 0.15% | 260 | 6 |

Iron (III) sulfate, aluminum sulfate, and zinc sulfate are the preferred crystal modifiers based on the following considerations:
1) Effectiveness at enhancing calcination;
2) Low price and/or easy availability;
3) Low health risks.

The forms of invention shown and described herein are to be considered only as illustrative. It will be apparent to those skilled in the art that numerous modifications may be made therein without departing from the spirit of the invention and the scope of the appended claims.

The invention claimed is:

1. In an improved process for producing a composite product, said process comprising:
   mixing water, gypsum and a cellulosic fiber to form a dilute slurry;
   heating the slurry, under pressure, to form acicular calcium sulfate alpha hemihydrate crystals;
   substantially dewatering the hot slurry and shaping the dewatered slurry to form a composite product before rehydrating the hemihydrate back to gypsum;

said improvement comprising adding a crystal modifier to said dilute slurry, said crystal modifier is selected from the group of aluminum chloride, and chlorine, to increase the aspect ratio of said hemihydrate crystals to at least 5:1.

2. The improved process of claim 1, wherein the amount of crystal modifier Is from about 0.05% to about 5% by weight, based on the weight of the gypsum.

3. The improved process of claim 2, wherein the amount of crystal modifier is from about 0.1% to about 1% by weight, based on the weight of the gypsum.

4. In an improved process for continuously producing a composite product, said process comprising:
   mixing water, gypsum, cellulosic fiber and alum to form a dilute slurry;
   heating the slurry, under pressure, to form acicular calcium sulfate alpha hemihydrate crystals;
   substantially dewatering the hot slurry and shaping the dewatered slurry to form a composite product before rehydrating the hemihydrate back to gypsum;
   said improvement comprising continuously monitoring the aspect ratio of said acicular calcium sulfate alpha hemihydrate crystals,
   when said monitoring indicates the aspect ratio of said crystals is lower than 5:1, increasing the amount of alum used to form said slurry, the amount of alum being sufficient to increase said aspect ratio to no lower than 5:1; and
   when said monitoring indicates the aspect ratio of said crystals is greater than 50:1, reducing the amount of alum being used to form said slurry, the amount of alum being sufficient to decrease said aspect ratio to no greater than 50:1.

5. The improved process of claim 4, wherein the amount of alum used to form said slurry is increased if said monitoring indicates the aspect ratio of said crystals is lower than 10:1.

6. In an improved process for continuously producing a composite product, said process comprising:
   mixing water, alum, gypsum and a cellulosic fiber to form a dilute slurry;
   heating the slurry, under pressure, to form acicular calcium sulfate alpha hemihydrate crystals;
   substantially dewatering the hot slurry and shaping the dewatered slurry to form a composite product before rehydrating the hemihydrate back to gypsum;
   said improvement comprising continuously monitoring the aspect ratio of said acicular calcium sulfate alpha hemihydrate crystals and adjusting the amount of alum used to form said slurry, the amount of alum being sufficient to maintain the aspect ratio of said crystals to at least about 5:1 and no greater than about 50:1.

7. The improved process of claim 6, wherein the amount of alum is adjusted to maintain the aspect ratio of said crystals to at least about 10:1 and no greater than about 50:1.

* * * * *